A. L. PALIS.
AUTOMATIC TIME CONTROL FOR LIGHTS.
APPLICATION FILED AUG. 31, 1915.
1,193,817.
Patented Aug. 8, 1916.
4 SHEETS—SHEET 4.
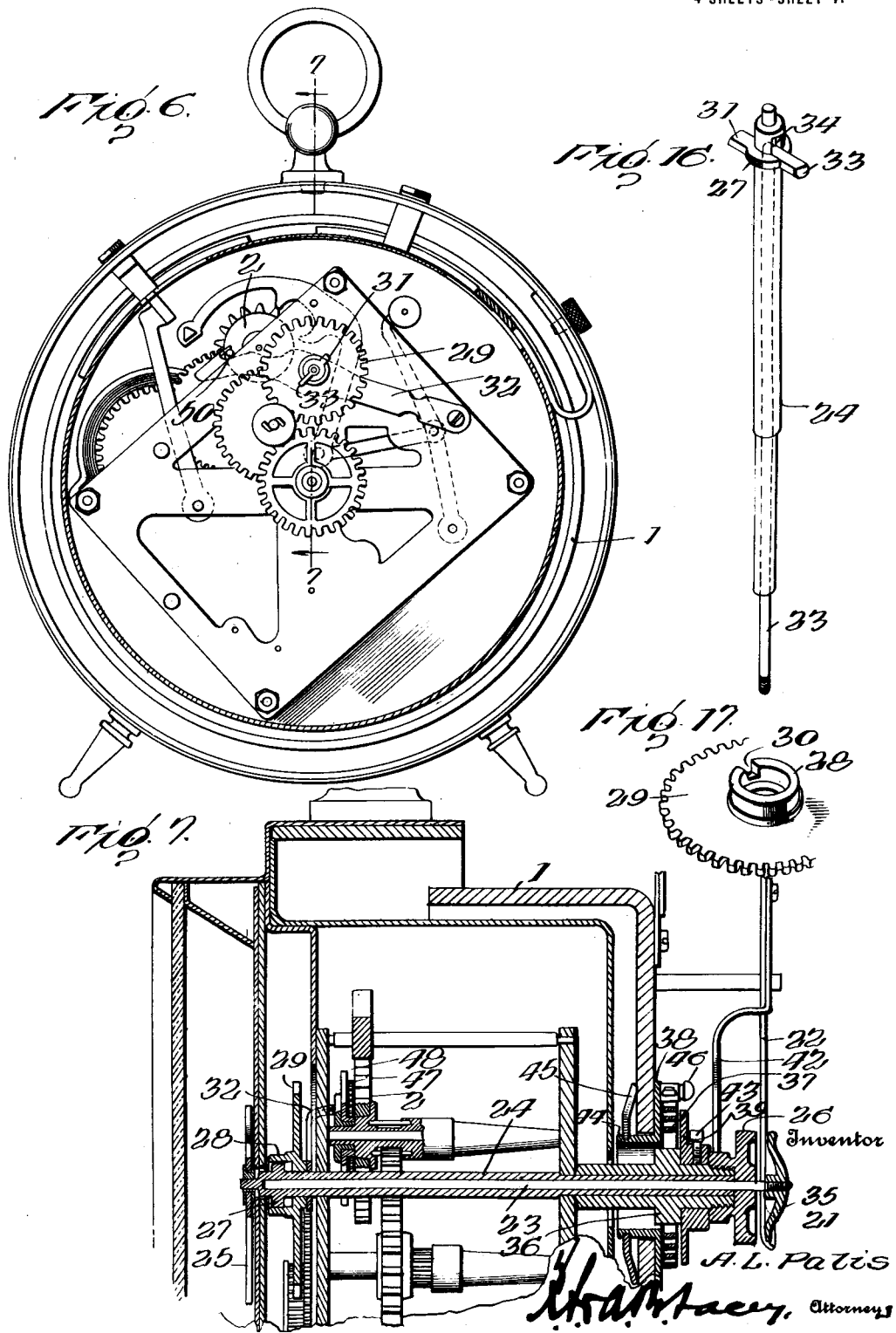

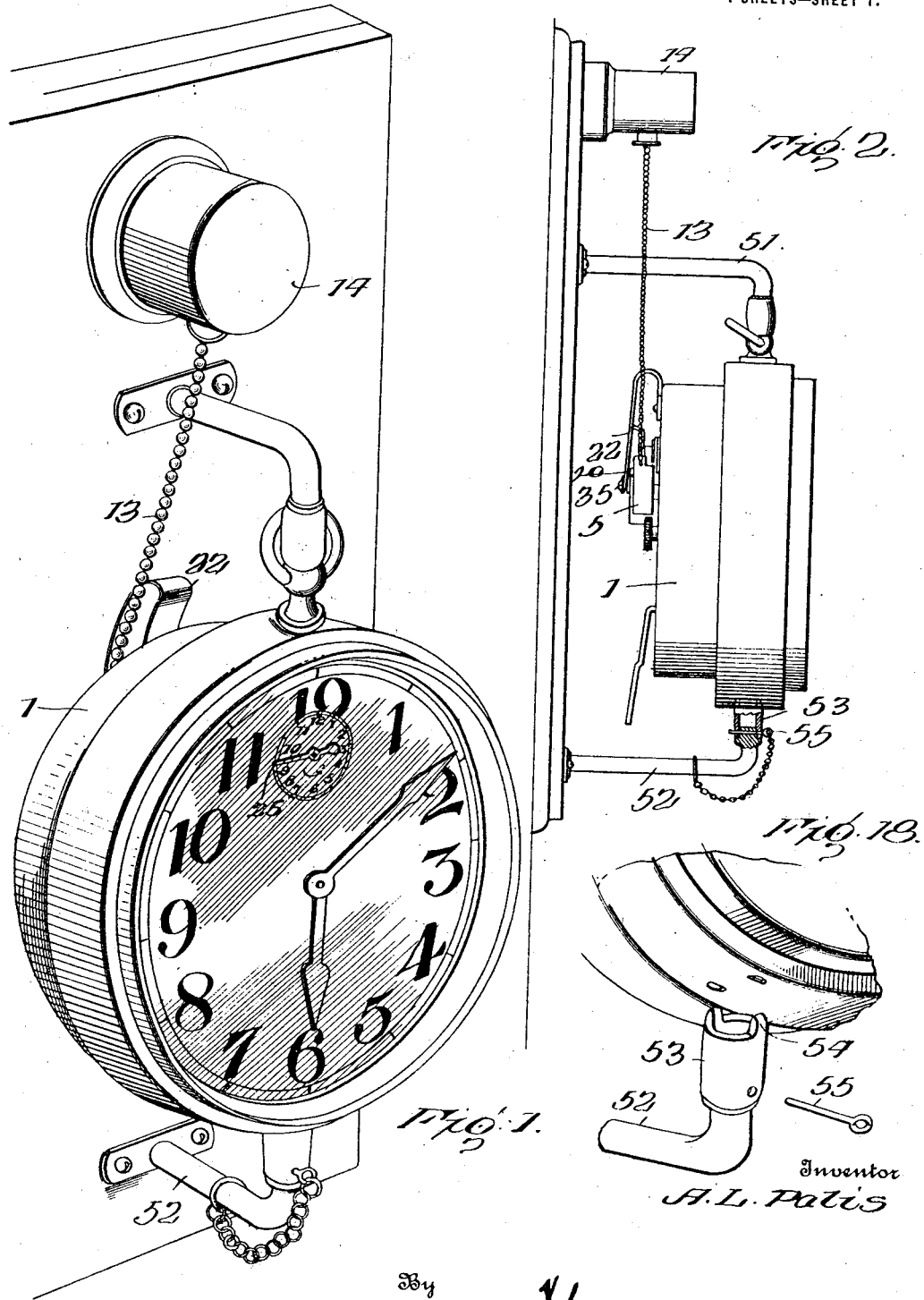

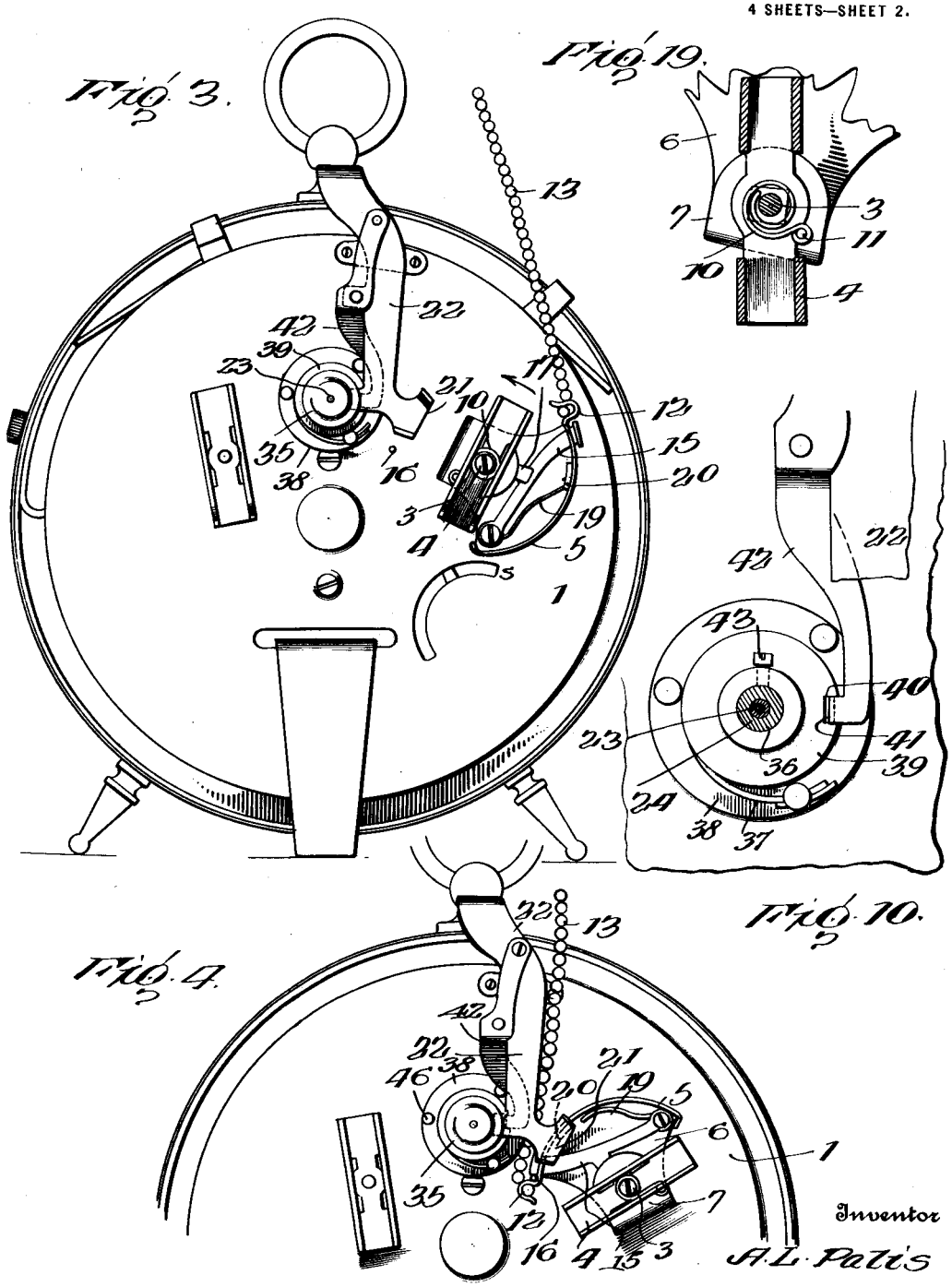

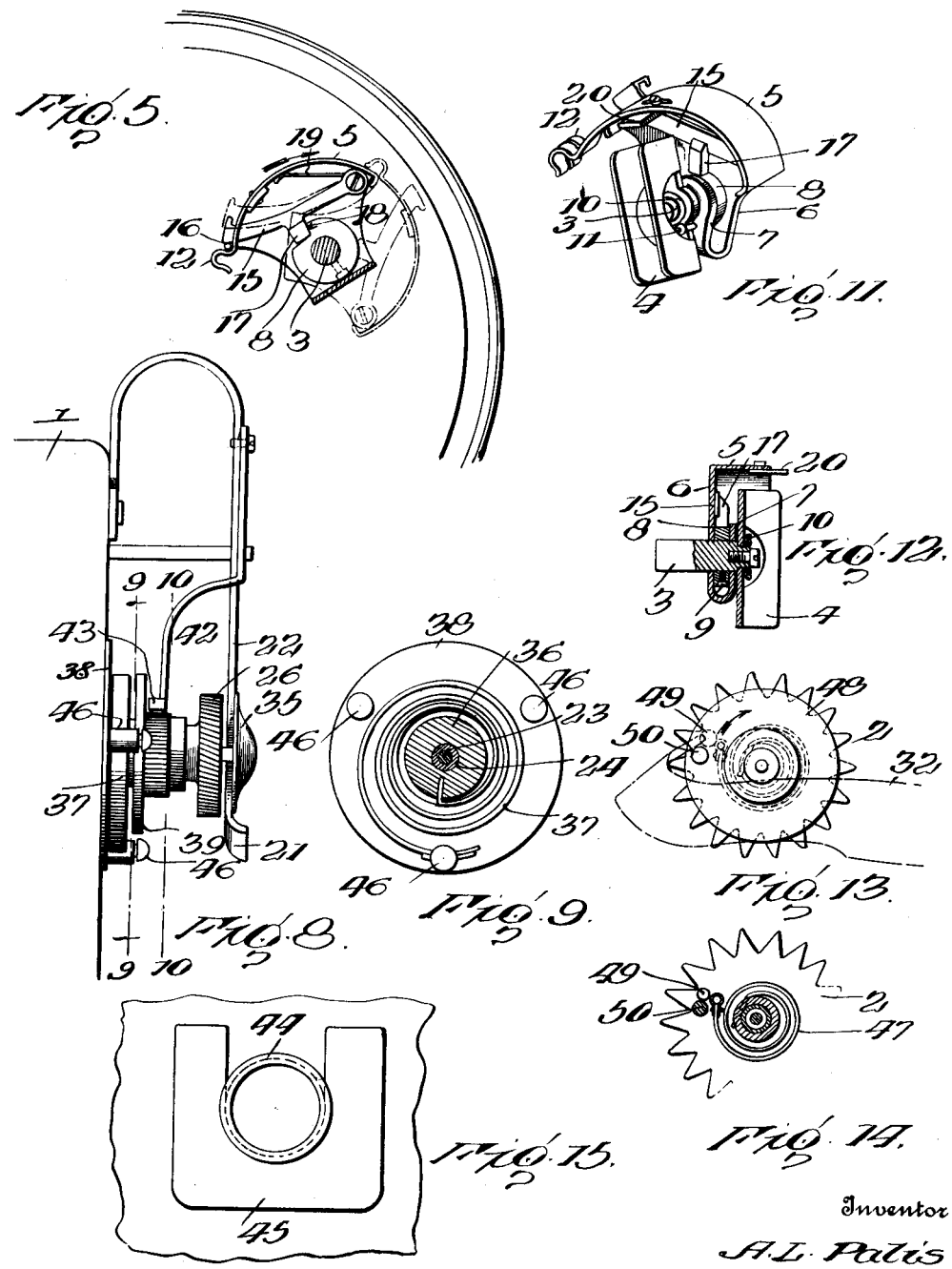

the following is a specification.
UNITED STATES PATENT OFFICE.

AUGUST L. PALIS, OF UPLAND, CALIFORNIA.

AUTOMATIC TIME CONTROL FOR LIGHTS.

1,193,817.   Specification of Letters Patent.   Patented Aug. 8, 1916.

Application filed August 31, 1915. Serial No. 48,261.

*To all whom it may concern:*

Be it known that I, AUGUST L. PALIS, a citizen of the United States, residing at Upland, in the county of San Bernardino and State of California, have invented certain new and useful Improvements in Automatic Time Control for Lights, of which the following is a specification.

Under varying conditions and for many reasons it is required to perform acts at stated intervals and such acts are usually effected by personal attention. Thus, for instance, the turning on and the turning off of lights at predetermined periods are generally effected by an attendant, for instance, a watchman.

The present invention provides mechanical means for automatically turning on and turning off lights or performing other acts at predetermined intervals, such means being adjustable so as to be set for operation at required periods without necessitating any attention except that necessary for winding and setting.

The invention utilizes the time movement provided with all accustomed alarm mechanisms which may be set to go off at any required time. In selecting a time movement of this type for illustrating the preferred embodiment of the invention, a clock known as "Big Ben" has been chosen and shown in connection with an electric light switch of the variety having a pull piece which is drawn upon to turn on the light and again drawn upon to turn off the light. These two operations are automatically performed by a time movement embodying the invention.

The invention consists of two setting members adjustable relatively to each other and to the movement, whereby the latter may be set to accomplish the desired results at the required periods of time.

The invention further consists of a yieldable connection between the two setting members whereby when one of the members is tripped the other member is thrown to the next position to set the movement for the second operation at the predetermined moment.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings:—Figure 1 is a perspective view of the time movement embodying the invention showing the same coupled to an electric switch. Fig. 2 is a side view of the parts illustrated in Fig. 1, a portion of the connection between the case and the lower bracket being broken away. Fig. 3 is a rear view of the clock movement, showing the normal position of the parts. Fig. 4 is a rear view of a portion of the clock showing the position of the parts when the key of the usual alarm mechanism has turned forward a distance to turn on the light and trip the setting mechanism for the next or second movement. Fig. 5 is a detail view showing the connecting means between the alarm winding mechanism and the attachment mounted thereon, the full lines showing the normal position of the parts and the dotted lines indicating the position of the parts when the attachment has been tripped. Fig. 6 is a front view of the clock movement, the cover being omitted and a portion of the clock case being in section. Fig. 7 is an enlarged detail section on the line 7—7 of Fig. 6. Fig. 8 is a detail view in elevation of the setting members and parts coacting therewith. Fig. 9 is a detail section on the line 9—9 of Fig. 8, showing more particularly the member whereby the movement is set for turning off the light or for performing the second act. Fig. 10 is an enlarged section on the line 10—10 of Fig. 8, showing more particularly the member for setting the movement for turning on the light or effecting the first act. Fig. 11 is a detail view in perspective of the usual alarm winding key having the attachment mounted thereon. Fig. 12 is a longitudinal section of the parts illustrated in Fig. 11. Fig. 13 is a detail view of the wheel of the train of gearing, whereby movement is transmitted to the alarm mechanism, showing elements coöperating therewith. Fig. 14 is a view of the wheel illustrated in Fig. 13 showing more clearly the spring connection between such wheel and the stop disk. Fig. 15 is a detail view of the spring connection between the second setting member and the case of the movement. Fig. 16 is a detail perspective view of the concentric arbors, one carrying the indicating hand of the setting mechanism and the other for tripping the setting mechanism. Fig. 17 is a detail perspective view of the controlling wheel which is adapted to be tripped at the stated periods. Fig. 18 is a detail perspective view showing more clearly the connecting means between the lower bracket and the clock case. Fig. 19 is a detail view showing more clearly the yieldable connection between the alarm winding key and the frame loosely mounted thereon.

Corresponding and like parts are referred to in the following description and indicated in all the views of the accompanying drawings by the same reference characters.

So far as the scope of the invention is concerned a clock or time movement of any variety may be employed, provided the same is equipped with the ordinary alarm mechanism which may be wound and set in the accustomed manner. Such alarm mechanism is generally wound after each operation and is provided with an independent winding key which is readily accessible from the exterior of the clock and is provided as a part thereof. In accordance with this invention, such alarm winding key has an attachment fitted thereto and yieldably connected therewith, such attachment being connected with the part to be operated. When the alarm mechanism is tripped, the key is turned in a reverse direction to that required for winding the alarm mechanism and such movement of the key is utilized for turning on and turning off the light or performing other required work. In the rotation of the key, when the alarm mechanism is running down, the attachment mounted thereon is set in motion and at a given point in its travel the setting mechanism is tripped so as to move to the second position for turning off the light or performing the second act in the operation of the mechanism.

The clock or time movement illustrated is of well known construction and is generally known by the trade name, "Big Ben," and embodies a bell 1 and alarm mechanism including a scape wheel 2. The key for winding the alarm mechanism includes a shank 3 and a thumb piece 4. Upon the shank 3 is mounted a frame which comprises an arcuate portion 5 and spaced portions 6 and 7. A collar 8 is mounted upon the shank 3 between the parallel portions 6 and 7 and is secured to the shank in the required adjusted position by means of a screw 9 which is threaded into an opening formed in the collar 8. A coil spring 10 forms a yieldable connection between the key and the frame. One end of the coil spring 10 is attached to the shank 3 whereas the opposite end is connected to the frame by means of a pin 11 which also acts in the capacity of a stop to limit the relative movements of the frame and the key. The arcuate portion 5 of the frame is formed with a hook-shaped extension 12 which is slotted to receive the pull piece 13 extending from the part to be operated which, in the present instance, is shown as consisting of an electric switch 14 of ordinary construction for turning on and turning off an electric light. One pull upon the part 13 turns on the light and a second pull upon the part 13 turns off the light. The pull piece 13 is shown as consisting of a chain, a link of which is engaged by the hook extension 12 of the key operated frame.

A lever 15 is mounted upon the key-operated frame and is pivoted at one end thereof and its opposite end projects beyond the arcuate portion 5 to be engaged by a stop 16 whereby the lever is tripped and releases the frame which is instantly thrown to the second position for operating the part 13 when the light is to be turned off. The lever 15 is formed intermediate of its ends with a projection 17 which is adapted to engage a shoulder 18 upon the collar 8 formed by cutting away an edge portion of said collar. A spring 19 is connected to the lever 15 and normally exerts a pressure thereon to hold the projection 17 in engagement with the stop shoulder 18. When the movement of the lever 15 is arrested by coming in contact with the pin of stop 16, a continued movement of the key and frame effects a disengagement of the projection 17 from the stop shoulder 18, and when this is accomplished the frame is returned to the second position by means of the spring 10 which, when the mechanism is set, is under tension. When the frame is thrown to the second position, the pin 11 engages the side of the finger piece 4 of the key thereby limiting the movement of the frame. The frame is provided with a cam 20 which is preferably adjustably connected thereto, although this is not essential, as the cam 20 may form a part of the frame. The cam 20 is preferably disposed upon the arcuate portion 5 of the frame and is positioned so as to ride under the projecting part 21 of a spring arm 22 which is attached at one end to the bell 1 or other convenient part of the frame of the clock or time movement.

The mechanism comprising the clock movement is modified to the extent of providing concentric arbors 23 and 24. The arbor 24 is tubular and receives the arbor 23 which is slidable longitudinally in the tubular arbor 24. The indicating hand 25 is secured to the forward end of the tubular arbor 24 and coöperates with a dial for indicating the time, such dial being provided upon the face of the clock in the usual way. The rear end of the arbor 24 which projects beyond the back of the clock is provided with a thumb piece or button 26 by means of which the mechanism may be set. The forward end of the arbor 24 is formed with a collar 27 which plays in a recess formed in a hub 28 at the outer face of a wheel 29. The hub 28 is formed with a notch 30 which is adapted to receive a projection 31 extending laterally from the collar 27. The wheel 29 is included in the train of gearing and is mounted so as to receive both a rotary movement and a sliding movement on the arbor 24. The lateral projection 31 when not engaged in the notch 30 rides upon the outer edge of the hub 28 and holds the wheel 29 pressed rearward against the action of a spring 32. When the notch 30 in the hub 28 registers with the projection 31, the wheel 29 is thrown outward by the action of the spring 32 and thereby releases the alarm mechanism and permits the turning on of the light or the performance of the first act of the work for which the time movement is designed. The arbor 23 slidable longitudinally only in the tubular arbor 24 is provided at its outer or forward end with a lateral projection 33 which extends through a longitudinal slot 34 formed in the outer portion of the arbor 24. The lateral projection 33 is adapted to bear upon the outer end of the hub 28 and thereby press the wheel 29 rearward to bring the spring 32 into position to arrest the movement of the alarm mechanism. The arbor 23 is provided at its rear end, which extends beyond the thumb piece or button 26, with a button 35 which is adapted to be engaged by the spring arm 22.

A collar or sleeve 36 is frictionally secured to the rear portion of the arbor 24 and has one end of a coil spring 37 attached thereto, the opposite end of said spring being adjustably connected to a setting member 38 which is adjustably mounted upon the case or the frame work of the clock or movement. The coil spring 37 is initially under tension and serves to throw the arbor 24 and hand 25 to the second position the instant the arbor 24 is released from the wheel 29. This result is brought about by a setting member 39 which is adjustably connected with the arbor 24 or the sleeve 36 secured to such arbor. The setting member 39 consists of a disk which is provided in its edge with a notch 40 disposed to receive a projection 41 of a supplemental arm 42 carried by the arm 22 and movable therewith. Under normal conditions the projection 41 of the supplemental arm 42 engages the notch 40 and holds the member 39 and arbor 24 at rest against the tension of the spring 37. When the spring arm 22 is tripped and thereby moves the supplemental arm 42 so as to release the setting member 39, the pin 31 is released from the notch 30 as presently set forth, the spring 37 comes into play and, by reason of its tension, rapidly rotates the arbor 24 to move the hand 25 to the second position for turning off the light or performing the second act in the work to be accomplished. The spring arm 22, as hereinbefore stated, is actuated by means of the cam 20 of the key operated frame consisting of the members 5, 6 and 7. The lever 15 and the arm 22 are tripped about at the same time so that the key operated frame and indicating hand 25 are turned to the second position at or nearly the same instant. The setting member 39 is adjustably connected with the arbor 24 by means of a screw 43. The setting member 39 determines the time when the light is turned on or the first act performed, hence such setting member may be adjusted to the required position and after being adjusted is made secure by means of the screw 43. The setting member 38 likewise consists of a disk which is provided with a hub 44 which passes through an opening formed in the bell 1 or other part of the clock case or movement frame. The inner end of the said hub 44 is formed with an external annular groove in which is engaged a spring 45 which maintains a tension to hold the member 38 in adjusted position. For convenience of adjusting the member 38, the same is provided with a plurality of projections 46 which may be reached by means of a slender instrument to permit of turning the member 38 when it is required to set the same for turning off the light or performing the second act at the predetermined time. The two members 38 and 39 determine the times when the acts are to be performed, and are automatic in operation after they have been set and the movement and alarm mechanisms properly wound.

The scape wheel 2 is fixed upon its arbor and is yieldably connected to a disk 48 by means of a coil spring 47 which has one end connected to the scape wheel and its opposite end attached to the said disk 48. A stop 49 projects laterally from the scape wheel 2 and is adapted to engage a stop 50 projecting from the disk 48. When the stops 49 and 50 are in engagement, the scape wheel is prevented from turning when the disk 48 is engaged by the spring lever 32. The stop 50 consists of a pin supported in the disk 48 and projecting from opposite sides thereof, one end of such pin constituting a stop to be engaged by the stop 49 and the other end of the pin constituting a stop to be engaged by means of the lever 32. The spring 47 is initially under tension and, when the lever 32 is first moved to release the disk 48 and scape wheel 2, the disk 48 moves rapidly before it is brought to rest by reëngagement with the end of the lever 32. After the stop 50 engages the lever 32 the scape wheel 2 may continue to rotate, thereby affording ample opportunity for the several parts to become set for turning off the light or for the performance of the second act, as may be required.

The clock may be held in proper position by suitable supporting means and, as indicated, brackets 51 and 52 are employed. The upper bracket 51 is adapted to engage the stem of the clock case. The lower bracket 52 engages a stud 53 secured to the bottom of the clock case. The stud 53 is formed with two spurs which pass through the openings formed in the clock case and have their projecting ends clenched. The brackets 51 and 52 have their outer ends bent and extended toward each other. The bent end of the lower bracket 52 is shouldered and receives the hollow stud 53. A pin 55 passes through registering openings formed in the overlapping parts of the stud 53 and bracket 52, thereby holding the clock in position against possible turning. When the pin 55 is removed, the clock may be readily disengaged from the brackets 51 and 52 to admit of the parts being set and the alarm and clock movements wound.

Inasmuch as the invention is primarily intended for turning on and turning off lights in show windows and other places requiring such lights to be turned on and off at stated intervals, the mechanism illustrated is shown in such adaptation, and the chain or pull piece 13 of the electric switch 14 is engaged with the hook projection 12 of the frame mounted upon the key of the alarm mechanism. When the members 38 and 39 are properly set, as hereinbefore stated, the several coil springs 10, 37 and 47 are under tension. The indicating hand 25 is set to the time when the light is to be turned on or the first act of the work to be performed accomplished. When the wheel 29 reaches a position so that the notch 30 registers with the projection 31, such wheel is thrown forward a distance to cause the projection 31 to enter the notch 30. The wheel 29 is thrown forward by the spring 32 which, at the same time, releases the disk 48, thereby permitting the alarm mechanism to operate. At this instant, the disk 48 is permitted to turn one or more times before it is arrested by the spring 32 again engaging the stop 50. Even when the spring 32 has engaged the stop 50, the scape wheel 2 may continue to turn for almost one revolution before its movement is arrested by the stop 49 engaging the stop 50. During this time the key of the alarm winding mechanism rotates and moves the frame mounted thereon to the position indicated in Fig. 4, thereby pulling upon the element 13 and turning on the light or effecting the first act or movement of the required work. When the frame mounted upon the key of the alarm mechanism reaches the position about as indicated in Fig. 4, the lever 15 is tripped, thereby releasing the frame which is returned to the position indicated by the dotted lines in Fig. 5 by means of the spring 10. When the frame reaches the position substantially as indicated in Fig. 4, the cam 20 rides under the projecting part 21 of the spring arm 22 and moves the free end of such arm rearward, carrying with it the arm 42 and releasing the setting member 39 and the arbor 24. The movement of the arm 22 moves the arbor 23 and its finger 33 rearward, thereby pressing the wheel 29 rearward and bringing the end of the spring 32 into engagement with the stop 50 and at the same time withdrawing the notch 30 from engagement with the projection 31, whereupon the arbor 24 is thrown to the second position by the action of the spring 37 in the manner stated. When the frame mounted upon the key of the alarm mechanism returns to the first position, the arms 22 and 42 assume their normal positions. When the wheel 29, in the continued operation of the clock movement, assumes a position to bring the notch 30 in register with the projection 31, which agrees with the time when the light is to be turned off or the second operation effected, such wheel 29 is again thrown forward by the action of the spring 32, thereby releasing the scape mechanism and permitting the key of the alarm mechanism to again rotate the frame mounted thereon in a direction to pull upon the part 13 a second time to complete the work for which the mechanism has been devised.

Having thus described the invention, what is claimed as new is:

1. A time movement provided with the usual alarm mechanism including an indicating hand and a key, means mounted upon such key and having a limited movement thereon and adapted to be connected with a part to be moved, means yieldably connecting the first mentioned means with the key for returning said means to a given position after an initial operation of the alarm mechanism, and means for moving said indicating hand to a second position and adapted to be tripped by means of the first mentioned means.

2. In a time movement of the character specified and in combination with the winding key, a frame mounted loosely upon the key and having a limited movement, a yieldable connection between the frame and key, and means for holding the frame in a given position against the tension of the yieldable connection.

3. In a time movement and in combination with the winding key, a frame loosely mounted upon the key, a coil spring forming yieldable connecting means between the frame and key, a lever mounted upon the frame, and a stop carried by such lever and adapted to engage the coacting stop of the key to hold the frame in position against the tension of the coil spring.

4. In a time movement and in combination with a key, a frame mounted loosely upon the key, a stop projecting from the frame and extending across the path of a portion of the key, a coil spring connected at one end to the stop and at its opposite end to the key, and means mounted upon the frame and adapted to engage the key to hold the frame in a given position against the tension of the coil spring.

5. A key comprising a shank and a thumb piece, a frame mounted loosely upon the shank and comprising spaced portions, a collar secured to the shank between the spaced portions of the frame, a spring connection between the frame and key, and coacting stop means mounted upon the frame and key for holding the frame in a given position against the tension of the spring.

6. In combination, a key comprising a shank and a thumb piece, a frame comprising an arcuate portion and spaced portions, the latter loosely receiving the shank of the key, a collar secured to the shank between the spaced portions of the frame, a spring connection between the frame and key, a stop carried by the frame and adapted to engage the key, and coöperating stop means mounted upon the frame and key for holding such frame in a given position against the tension of the spring.

7. In a time movement, concentric arbors, the inner arbor having a lateral projection extending beyond the outer arbor and the latter adapted to have an indicating hand attached thereto and provided with a lateral projection, a gear wheel loose upon the outer arbor and formed with a hub having a notch therein to receive the lateral projection of the outer arbor, and means whereby the said gear wheel and the inner arbor may move independently.

8. In a time movement, concentric arbors, the outer arbor receiving an indicating hand and provided with a lateral projection, the inner arbor having a lateral projection extending through a longitudinal slot formed in the side of the outer arbor, a wheel loose upon the outer arbor and having a hub formed with a notch to receive the lateral projection of the outer arbor, a spring normally exerting a pressure upon such wheel to cause the lateral projection of the outer arbor to enter the notch formed in the hub of such wheel, a scape movement, and means for releasing the scape movement brought into operation by the movement of the before mentioned wheel.

9. In a time movement, a scape mechanism comprising a scape wheel, a disk, a spring connection between the scape wheel and disk, coöperating stop means between the scape wheel and disk, and stop means adapted to engage the said disk.

10. In a time mechanism, concentric arbors, an indicating hand carried by the outer arbor, a wheel loose upon the outer arbor, coöperating means to effect engagement between the two arbors and wheel, a scape wheel, a disk, a spring connection between said disk and scape wheel, coöperating stop means between the disk and scape wheel, and a member adapted to engage the said disk and controlled in its movements by means of the before mentioned wheel.

11. In a time movement, a work performing mechanism, two setting members controlling said mechanism, a coil spring connection between the two members, means for operating said setting members successively and restraining means engaging the initially movable setting member.

12. In a time movement of the character specified, an adjustable setting member, a second setting member, a coil spring connection between the two setting members, means for engaging the said second setting member to hold the same in the given position against the tension of the coil spring connecting the two setting members, and means for tripping the restraining means.

13. In a time movement of the character specified, the combination of a setting member, means for securing such setting member in adjusted position, a second setting member, means for securing the second setting member in an adjusted position relative to the first setting member, a coil spring connection between the two setting members, detent means for engaging the second setting member and holding the same in the required initial position, and means for tripping the detent to permit operation of both members.

14. In a time movement of the character specified, a time operated mechanism, a time setting mechanism, means adapted to be operated by the time operated mechanism at the stated periods determined by the setting mechanism, work-connecting means having yieldable connection with the time operated mechanism to be initially actuated thereby, a trip mechanism for releasing the work connecting means to permit of the same automatically returning to a given position to be again actuated for completing the desired work.

In testimony whereof I affix my signature.

AUGUST L. PALIS. [L. S.]